C. C. STARR.
FOLDING AUTOMOBILE BED.
APPLICATION FILED JAN. 24, 1921.
1,415,727.
Patented May 9, 1922.
2 SHEETS—SHEET 1.
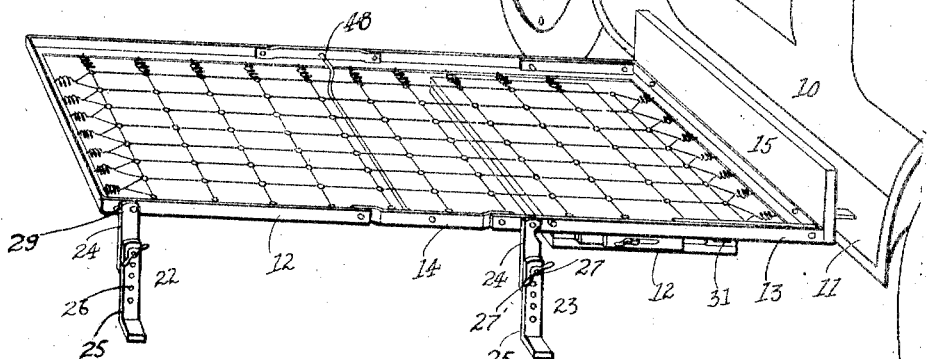
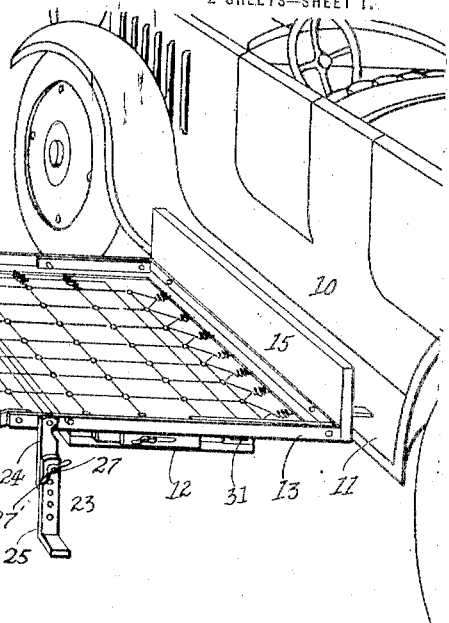
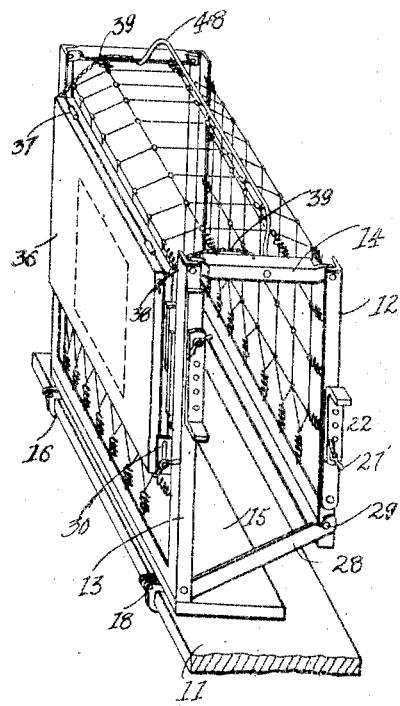
INVENTOR.
C. C. Starr.
BY Victor J. Evans
ATTORNEY

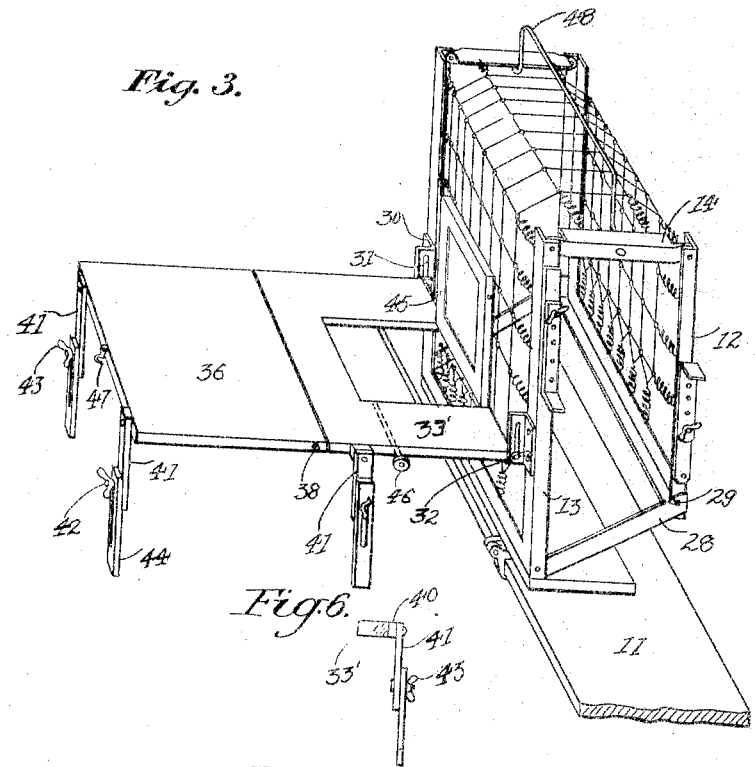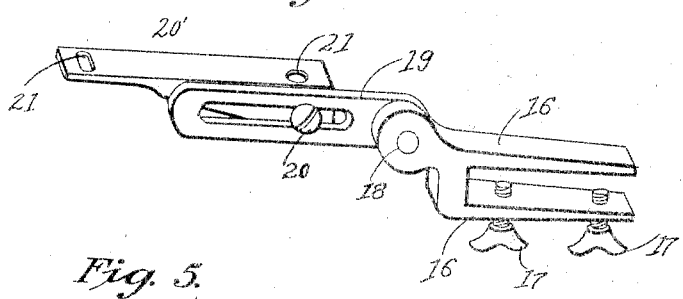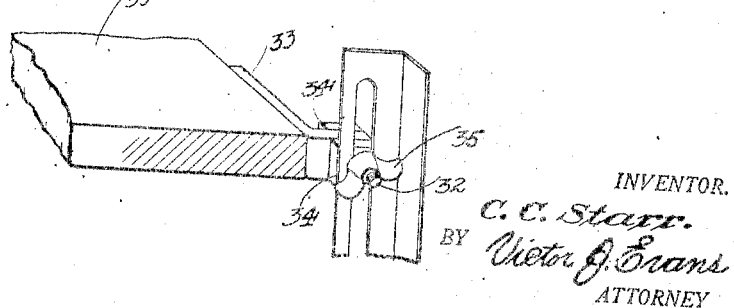

UNITED STATES PATENT OFFICE.

CLARENCE C. STARR, OF SAN FRANCISCO, CALIFORNIA.

FOLDING AUTOMOBILE BED.

1,415,727. Specification of Letters Patent. Patented May 9, 1922.

Application filed January 24, 1921. Serial No. 439,488.

*To all whom it may concern:*

Be it known that I, CLARENCE C. STARR, a citizen of the United States, residing at San Francisco, in the county of San Francisco and State of California, have invented new and useful Improvements in Folding Automobile Beds, of which the following is a specification.

This invention relates to improvements in attachments for motor vehicles, and has particular reference to a folding automobile bed adapted to be used by tourists to enable them to have a convenient outdoor bed for use either at a camping or stopping place.

One object of this invention is to provide a bed of the above mentioned character, which has associated therewith novel means for detachably fastening the bed to the running board of an automobile.

Another object of this invention is to utilize the running board of an automobile for a storing place for the folded or collapsed bed, and at the same time serve as a rigid support for one end of the extended bed.

A further object of this invention is to provide a bed of the character described, which has associated therewith a table adapted to be compactly folded with the bed, or used independently of the bed when the latter is in a folded position.

A still further object of this invention is to provide adjustable means comprising legs provided on the bed and table whereby either the bed or table will be retained in a level position when the automobile is parked on an uneven surface.

An additional object of this invention is to provide a device of the character described, which is simple in construction, efficient, strong, durable, inexpensive to manufacture and compact in the arrangement of its parts.

Other objects and advantages of the invention will be apparent during the course of the following description:—

In the accompanying drawings forming a part of this specification, and in which like numerals are employed to designate like parts throughout the same, Figure 1 is a perspective view of the invention in its extended position attached to a motor vehicle, Figure 2 is a perspective view of the device in a folded position with a part of the running board to which it is attached being broken away, Figure 3 is a perspective view of the device positioned on the running board of a motor vehicle, with the bed frame being shown in a folded position, and a table in an extended position, Figure 4 is an enlarged detail view of the means for mounting the bed frame on the support, and the means for controlling the bed when adjusted from its folded to its extended position, Figure 5 is an enlarged fragmentary view of the table and a clamping element, forming part of my invention, applied thereto, and Figure 6 is a detail view of one of the extensions formed on the side of the table, with one of the legs pivoted thereto.

In the accompanying drawings wherein for the purpose of illustration is shown a preferred embodiment of my invention, the numeral 10 designates a motor vehicle, and the numeral 11 represents the running board or step thereof, which constitutes a fixed and stable support for the bed frame. The bed frame proper comprises a pair of end sections 12 and 13, an intermediate section 14 and a head board 15.

Connecting the head board with the running board of a motor vehicle, are a pair of bracket members, each of which comprises bifurcated arms 16 adapted to be secured to the running board 11 by set screws 17. To one extremity of each bracket member there is pivoted at 18 a slotted element 19, which has longitudinally movable therein a fastening element 20 which is detachably secured to a clamping element 20' provided with openings 21. The clamping element is adapted to be secured to the head board 15 and together with the slotted element 19 pivoted to the bracket, control the folding and extending of the sectional bed frame.

The bed frame has pivoted on the section 12 adjacent one extremity thereof, adjustable legs designated as a whole by the numeral 22, while the section 13 has likewise pivoted thereon adjacent one extremity, adjustable legs designated as a whole by the numeral 23. The legs 22 and 23 serve to provide means for retaining the bed frame in a normally horizontal position when the automobile is resting on an uneven surface and the bed is in use.

Each of the legs comprises a pivoted portion 24 and a base element 25 having formed therein holes 26. To permit adjustment of the legs, I have connected the sections 24 and 25 by a threaded bolt 27 equipped with a winged nut 27', the purpose of which is readily apparent.

Likewise pivoted on the inside of the bed frame adjacent one extremity of the section 13, are a pair of notched arms 28 adapted to receive in the notches thereof stops 29 provided on the section 12, the notched arms thus serving to retain the bed frame in a folded position, as shown to advantage in Figure 3.

Disposed beneath the section 13 and fastened to the same, are a pair of angle irons 30 having slots 31 formed therein. Through the slotted portion 31 of each angle iron there is inserted a pin 32 threaded adjacent one of its extremities, which pin is adapted to rest in an opening formed in an L shaped clamping element 33 adapted to be securely fastened to one section 33' of a table. For the purpose of regulating the different angular positions of the table, I have encircled the pin 32 with a pair of binding nuts 34 and a winged nut 35 adapted to be threaded on the pin 32 and bind the sides of the slotted portion of the L shaped clamping element against one of the nuts 34.

The table above mentioned comprises the section 33' and a second section 36 hinged at 37 for the purpose of allowing a folding of the table when so desired. From the construction set forth to advantage in Figures 3 and 5, it will be apparent that the table can be adjusted to various angular positions and moved independently of the bed frame when the latter is folded in an inactive position on the running board of the vehicle.

The numeral 38 designates stops provided on the second section 36 adapted to receive chains 39 secured to the intermediate section 14, which chains serve to retain the table in a folded position. When it is desired to utilize the table independently of the bed frame, the chains 39 are released from the stops 38 and the table is extended to the position shown to advantage in Figure 3.

For the purpose of supporting the table, I have provided adjustable legs adapted to be pivoted to the outer extremity of the second section 36, and to extensions 40 formed on the first section 33'. Each of these legs comprises a standard 41, pivoted to the sections of the table, and has provided therein a threaded element 42 equipped with a winged nut 43. The threaded element and winged nut serve to retain a slotted base section 44 in slidable relation to the standard 41 whereby the table can likewise be adjusted and retained in a level position when it is placed on an uneven surface. The section 33' of the table has provided therein a hinged panel 45, in which can be conveniently placed a mirror in order that the section 33' may serve the purpose of a dressing table when it is so desired. As shown in Fig. 3 when the mirror is held vertically against the bed, when the latter is folded, the opening left by the panel will provide a seat on the bed in front of the mirror so that a person may occupy the same with their legs accommodated by the opening. For the purpose of retaining the panel flush with the surface of the section 33', I have provided a pin 46. The construction of this pin and the operation of the same, are shown to advantage in Figure 3, and further detail description is not deemed necessary.

In order that the sections of the table may be retained in a folded position, I have provided a hook 47 on one edge of the second section 36, which hook is adapted to be fastened on a stop (not shown) positioned on the opposite edge of the first section 33'.

For conveniently operating the bed when it is desired to either extend or fold the same, a handle 48 is suitably attached to the intermediate section 14, which handle affords a convenient means for positioning the bed in its folded or extended form.

It is obvious from the foregoing description that a novel folding automobile bed has been provided, as well as improved means associated therewith for supporting the bed and always maintaining the level position of the bed when it is extended.

It is to be understood that the form of my invention, herewith shown and described, is to be taken as a preferred example of the same, and that various changes in the shape, size and arrangement of parts may be resorted to without departing from the spirit of the invention, or the scope of the subjoined claims.

Having thus described my invention, I claim:—

In a combination camping equipment, a folding bed having means at one end to clamp the same to the running board of an automobile and permitting it to assume an inactive folded position and a position set up transversely of the automobile, and a folding table carried under the bed adapted to be set up when the bed is in inactive folded position and folded under the bed when the bed is set up, said table having a hinged panel adapted to assume a vertical position against the bed when the bed is folded and leaving an opening in the table providing a seat and a space for accommodating the legs of a person occupying the seat and with the vertically presented panel serving as a mirror or the like support substantially as and for the purpose described.

In testimony whereof I affix my signature.

CLARENCE C. STARR.